United States Patent [19]

Bobart et al.

[11] 4,349,741
[45] Sep. 14, 1982

[54] EAR CODE WITH ALIGNMENT MARK

[75] Inventors: Kevin L. Bobart, Lexington, Ky.;
Gregory A. Flurry, Pleasantville, N.Y.

[73] Assignee: International Business Machines Corporation, Armonk, N.Y.

[21] Appl. No.: 198,311

[22] Filed: Oct. 20, 1980

[51] Int. Cl.³ .......................................... G06K 7/10
[52] U.S. Cl. ................................. 250/568; 235/462; 400/103
[58] Field of Search ............... 235/462, 466, 474, 475, 235/476, 477, 486; 250/548, 557, 561, 568, 569, 570; 400/103–108, 580, 581, 705, 708, 708.1, 709, 709.2

[56] References Cited

U.S. PATENT DOCUMENTS 3,463,081 8/1969 Levine ................................. 400/709
3,862,400 1/1975 Thomson ........................... 250/568
4,055,747 10/1977 Jensen ................................. 235/485

OTHER PUBLICATIONS

"Optical Mark Sensing of Single-Color Documents" by W. B. Plummer, IBM Tech. Disc. Bull., vol. 19, No. 8, 1/1977, p. 3174.

Primary Examiner—David C. Nelms
Attorney, Agent, or Firm—John A. Brady

[57] ABSTRACT

Alignment mark 5 is printed by printer 30 during the same operation in which bar code 3 is printed. Subsequent alignment is by the optical scanner 32 centering on mark 5. In a specific application a factor relating to the vertical position of scanner 32 to printer 30 is obtained by scanning mark 5 shortly after it is printed. This factor is used to position the scanner 32 to read for errors after a line of code 3 is printed.

11 Claims, 6 Drawing Figures

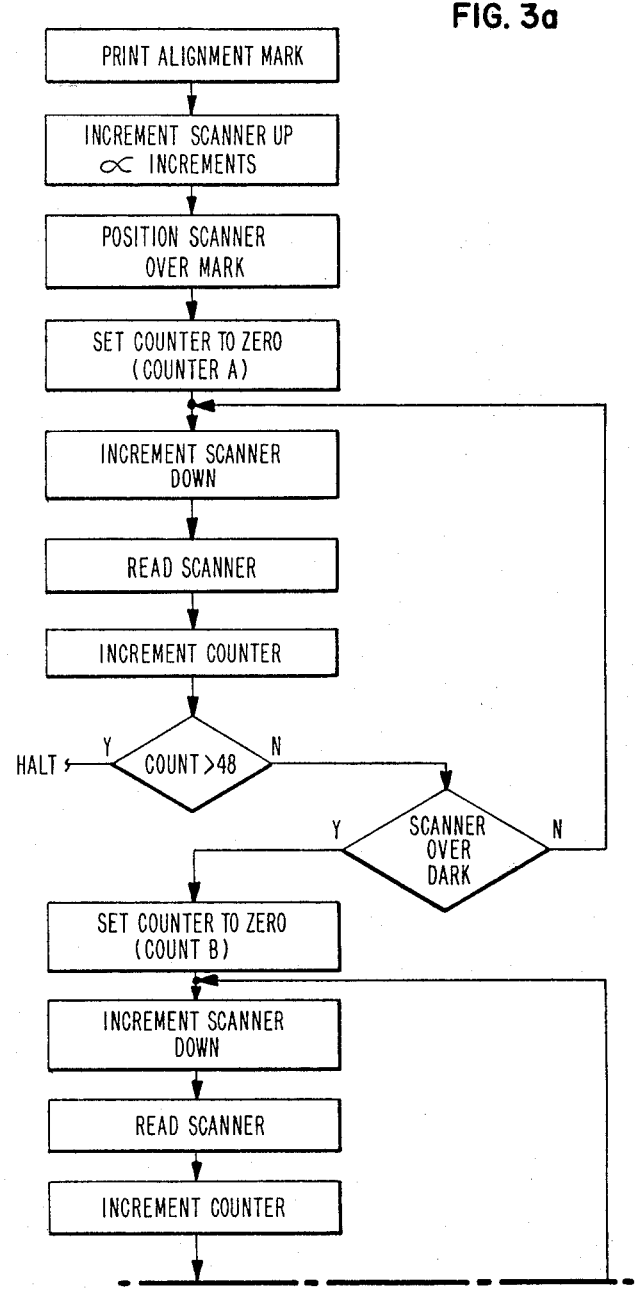

EAR CODE WITH ALIGNMENT MARK

DESCRIPTION

CROSS-REFERENCE TO RELATED APPLICATION

An application, Ser. No. 198,337, was filed on even date herewith and bearing the same title as this application has Gregory A. Flurry, Michael L. Krieg and David W. Phillips as the joint inventors. That is the same Gregory A. Flurry who is a joint inventor on this application. That application claims generically the printing of an alignment mark as an incident to the printing of bar code.

TECHNICAL FIELD

This invention relates to bar code symbol applications in connection with alignment marks. The bar code is an arbitrary group of lines having meaning by their width, spacing or the like when traversed by a scanner. The alignment mark is used to position the scanner in relation to code.

BACKGROUND ART

Bar codes are commonly known in various forms and are characterized by their capability of recording information which can be recovered by a single pass along a line by a scanning device. Typically, bar codes are a series of vertical marks which carry information by their varying widths, by the varying spacing between marks, or by both.

The dimensions of bar codes in the direction perpendicular to the scan have significance generally only to assure that the scan observes the code. Typically, positioning of the scanner can be assured only within a certain range of accuracy and the perpendicular dimension of the bar code must be at least broad enough to assure that the scanner observes the code when it is positioned anywhere within the range of accuracy. The positioning of the scanner can be so variable that the bar code must be quite broad.

To reduce the breadth of bar code and the consequent space used for recording, it is desirable to improve the precision of positioning the scanner. It is known generally in the scanning art to employ a separate mark as a guide or alignment reference which is sensed by the scanner and from which position the scanner is more precisely positioned with respect to the code to be sensed.

Where such an alignment mark is preprinted or printed in some manner not integral with recording the bar code information, such a use of an alignment or register mark is believed to be conventional and within the state of the art. U.S. Pat. No. 3,433,933 to Hardin is exemplary of such prior art. It teaches a narrow vertical line as an alignment mark, which is sensed to define a scan line through a column containing horizontal marks. The alignment mark in the preferred form of the instant invention is relatively wide. Although no direct alignment occurs off the mark in the following publication, it is cited because it differs from the cited patent in that the mark is relatively wide. That publication is the following: "Optical Mark Sensing of Single-Color Documents", by W. B. Plummer, *IBM Technical Disclosure Bulletin*, Vol. 19, No. 8, January 1977 at page 3174.

Other patents similar in use of alignments marks to the Hardin patent cited above could be mentioned, but they are considered less pertinent in that they involve the reading of alphabet symbols and the like. The instant subject matter differs fundamentally from known prior art in that the alignment mark is printed with the printing of the code information. In the preferred mode, rather than being a narrow line, the alignment mark is both substantially wide and thick. With the printing of the alignment mark prior to but with the printer to print bar code, the instant subject matter employs a scanning of the alignment mark to define a relationship between the printer and the scanner subsequently used to position the print head for re-reading printed code for errors.

DISCLOSURE OF THE INVENTION

It is an object of this invention to provide for more precise positioning of a scanner with respect to bar code information.

It is, similarly, an object of this invention to provide for bar code printing which may be short in the direction perpendicular to the intended direction of scan.

In accordance with this invention an alignment mark is printed by the printer which prints the bar code. In the preferred mode the alignment mark is substantially wider than one individual bar of the code.

In a specific application of the printing of the mark by the code printer, the alignment mark is scanned to determine its apparent center and a factor relating that to the position of the printer is obtained. Subsequently, after code is printed, the position of the scanner is adjusted by that factor when the printing is read for accuracy shortly after it is printed.

BRIEF DISCLOSURE OF THE DRAWINGS

FIG. 3a and FIG. 3b are a flow diagram of the compensation factor determination.

BEST MODE FOR CARRYING OUT THE INVENTION

The Printing System

Figure 1:
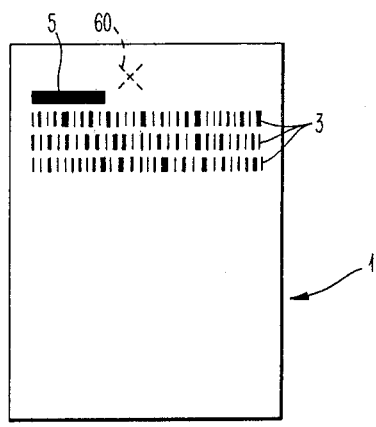
FIG. 1 illustrates an ordinary paper carrying bar code information and an alignment mark.

FIG. 1 shows a paper carrying bar code information 3 which may be in several parallel lines of different width as shown. Above that coded information is a horizontal alignment mark 5 in accordance with this invention, which is a solid rectangular mark printed along with the bar code information 3. The alignment mark is printed by the same printer which prints the bar code 3.

Figure 2:
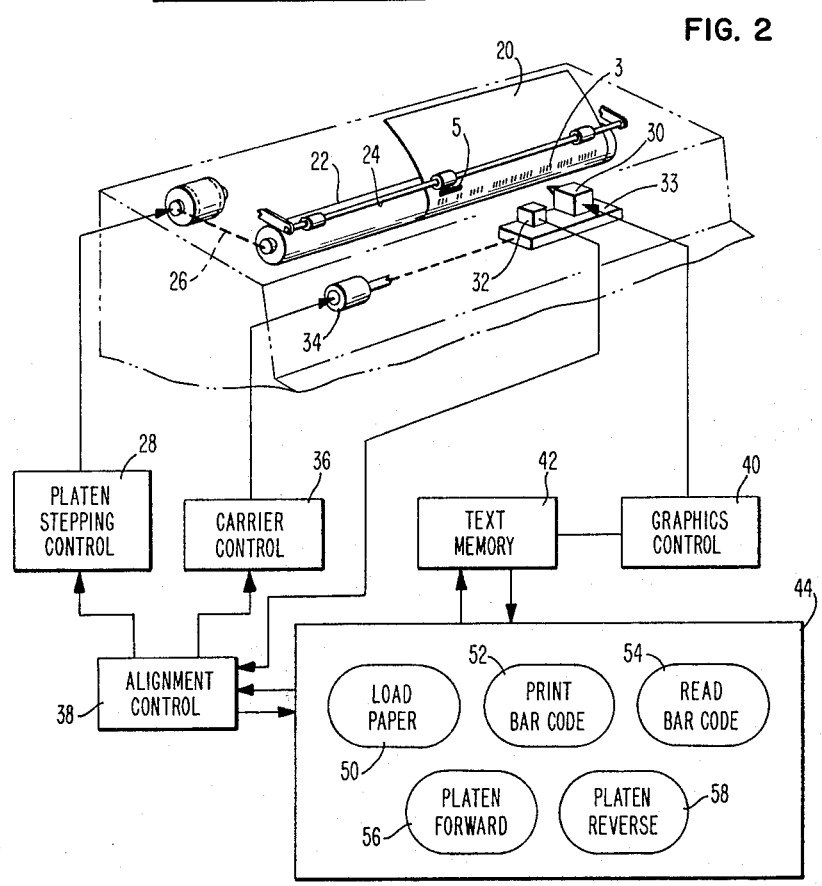
FIG. 2 is illustrative of the overall system.

FIG. 2 illustrates an operative system, which is under semi-automatic control. The printing elements and control hardware are basically conventional. A sheet of paper 20 to be printed upon, which is typically ordinary letter paper, is mounted against a platen 22, where it is held by bail 24. Paper 20 is moved longitudinally by platen drive 26, under control of platen stepping control 28.

Paper 20 is traversed horizontally by printer 30, which may be preferably a ink jet or matrix printer, and by optical scanner 32. Printer 30 and scanner 32 are mounted on a carrier 33 and are moved together by carrier drive 34 under control of carrier control 36.

The specific designs of printer 30 and optical scanner 32 form no part of this invention. An ink jet printer of any standard design is inherently well suited to print the solid rectangle of alignment mark 5 and the vertical bars of different widths which make up a typical bar code 3. Scanner designs typically incorporate a light source and a photoconductor in an optical path by which light is trained upon and the reflections are received from a small area being observed. For most purposes, only reflections from a limited, pre-defined area are passed to the photoconductor. In the preferred embodiment this is accomplished by an opaque screen having an opening, which is 30 mils in height and 3 mils in width.

The vertical bars 3 and alignment mark 5 are each approximately 68.5 mils in height. Platen 22 is stepped in increments of 1/96 inch. Movement of carrier 33 is measured in increments of 1/240 inch, while the drive is by a DC motor and uninterrupted. Indexing of platen 22 may be uninterrupted where movement of more than one increment is directed. When the movement of both platen 22 and carrier 33 is stopped, the final position is defined by the number of increments traversed. Such incremental position systems are well known in graphics and printing systems, and their details form no part of this invention and will not be described.

In the preferred embodiment of this invention, position of the paper 20 relative to the printer 30 and optical scanner 32 is monitored by storage in memory of a start position followed by counting of increments of indexing both positively and negatively. Although separate counting circuits and hardware logic could be provided, the preferred embodiment employs a general purpose microprocessor for control and implementation of the steps involved. This element is shown symbolically in FIG. 2 as alignment control 38. The printer 30 is additionally under the control of a microprocessor, shown symbolically as graphics control 40, to define the pattern of printing applied to paper 20. Graphics control 40 may be any state-of-the-art system for printing characters and predefined special symbols such as the alignment mark.

External Inputs

The text to be printed in bar code typically will be the contents of magnetic or other memory, shown as text memory 42. Although such text can be generated contemporaneously with its recording in bar code as will be described, usually it is generated in a full line or page and is proof read and revised as necessary prior to being taken from memory 42 to be printed in bar code.

Finally, FIG. 2 shows illustratively the manual key operations related to the subject invention of bar code printing with alignment mark. The operator control panel or keyboard 44 is shown illustratively. Loading of paper 20 on platen 22 may be manual. Where it is automatic, the operator manually operates the load paper key 50. With paper loaded, the machine will typically go through an automatic scan across the platen 22 from left of where paper 20 could be to past the right margin of paper 20. The left and right margins of paper 20 are observed by optical scanner 32 and defined in position and stored in alignment control 38. Alternatively, the paper 20 may simply be loaded at or within predefined points on platen 22 and the location of the edges of paper 20 will then be known, predetermined factors in control 38.

Paper 20 may be loaded for use in either of two modes, to print bar code 3 or to read bar code 3 from a paper which carries bar code 3 in accordance with this invention. For printing, paper 20 is typically blank, and the operator manually operates print bar code key 52. Information in text memory 42 will then be printed, along with the alignment mark as will be described below. For reading bar code, the operator manually locates scanner 32 higher than alignment mark 5 and manually operates read bar code key 54. The printing mode will first be described in detail.

Printing Bar Code

With paper 20 loaded on platen 22, operation of print bar code key 52 initiates further activity automatically with the sequence directed by alignment control 38. Initially, carrier 33 is brought to the predefined left printing margin by carrier drive 34 controlled by carrier control 36. The subsequent sequence is illustrated in the FIG. 3, a flow diagram. Alignment mark 5, a solid rectangular character 68.5 mils in height and 2 inches in width is printed by printer 30 and with the pattern defined by graphics control 40 as carrier 33 moves uninterrupted across the paper 20.

After alignment mark 5 is printed, without operator intervention, optical scanner 32 is centered over mark 5. Carrier 33 is first moved by control 38 upward a predetermined number of increments by platen drive 26 through platen stepping control 28. In the specific embodiment drive 26 is incremented eight times, each causing a movement of 1/96 inch. Control 38 then directs movement of carrier drive 34 through carrier control 36 to a point spaced the predetermined amount from the left margin of paper 20 at which the nominal or approximate center of mark 5 appears. In this way optical scanner 32 is positioned above alignment mark 5 without operator intervention.

Paper 20 is then indexed upward by platen drive 26 under stepping control 28. A counter in control 38 is set to zero and each index step is counted as alignment mark 5 is brought upward toward optical scanner 32. This is denominated Count A.

The purpose of this reading of alignment mark 5 before paper 20 is further printed upon is to define an effective vertical position difference between printer 30 and scanner 32. Even though they are mounted on carrier 33 to have the same effective vertical position, in practice variations occur. The present reading operation is to define a compensation factor for that difference.

Ideally, this compensation factor can be defined by a single scan through the alignment mark 5. Thus, in this ideal situation, the platen drive 26 is indexed until optical scanner 32 passes from white of paper to the dark of mark 5. As indicated, the light-path opening of scanner 32 is 30 mils high, almost one half the height of the mark 5. At a certain point, generally several increments after the light-path opening encounters some dark of mark 5, enough light will be blocked that the optical system will recognize dark. Count A is then completed and stored in alignment control 38. The counter is reset to zero and a new count, Count B, is begun, also of increments of platen drive 26 as paper 20 is continued to be moved vertically. At a certain point of scanner 32 being over white paper on the bottom side of mark 5, the optical system will recognize light. Count B is then completed and stored in alignment control 38. (It will be clear that the 30 mil high light-path opening may respond to mark 5 either to show the mark larger or smaller than it actually is, depending upon the sensitivity of the photoconductor involved. This will be the same at both the top and bottom of mark 5 and therefore will not shift the effective center indicated for mark 5).

In this theoretical situation, including the assumption that scanner 32 responds at or an equal distance from the top and the bottom of mark 5, the compensation factor is defined as follows: Count A +½ Count B —Upward Increments, the Upward Increments being those of the predetermined upward shift of the carrier taken immediately after mark 5 is printed, denominated $\alpha$ in the flow diagram. Where the compensation factor is negative, platen 22 must be indexed downward by the number of steps of the compensation factor from the position platen 22 was in when the line to be read was printed. The compensation factor is the product of a recognition that a line printed with the platen 22 at one position possibly must be scanned, for center scanning, with the platen 22 at a somewhat different position.

In the actual preferred implementation, for reasons not essentially related to this invention, the circuits responding to scanner 32 are not highly reliable at the initial transistion from white to dark. For that reason the preferred implementation is somewhat more complicated than the ideal discussed, as is discussed below and shown in the FIG. 3 flow diagram.

The upward increments and the Count A and Count B are as described. The sum of Count A and Count B is recognized as accurate only as defining the total increments from the start to the lower edge of mark 5 as it is responded to by scanner 32. When the lower edge of mark 5 is sensed and Count B terminated, the platen drive 26 is reversed. The total of Count B is stored in alignment control 38. The counter is reset to zero and a new count, Count C, is begun, also of increments of platen drive 26, but paper 20 is moved downward.

At a certain location of scanner 32 over white paper on the top side of mark 5, the optical system will recognize light. Count C is then completed and stored in alignment control 38. The compensation factor is defined as follows: Count A+Count B—½ Count C—Upward Increments. This factor is computed and stored by alignment control 38. As with the theoretical formula, where the compensation factor is negative, platen 22 is to be indexed downward (reversed) by the number of steps of the compensation factor from the position platen 22 was in when the line to be read was printed. When the factor is positive, platen 22 is to be indexed upward (forward).

The compensation factor is then used in the reading for error check while paper 20 remains in the machine after bar code 3 is printed. When a line of bar code 3 is printed, the line is immediately read by scanner 32 and compared with the corresponding part of text memory 42 for errors. Prior to each such reading, platen 22 is indexed by the compensation factor, so that the line of bar code 3 is traversed with scanner 32 centered on bar code 3. After such reading, when the platen 22 is indexed to print a new line, indexing in the opposite sense to the previous compensation factor is included.

Figure 3B:
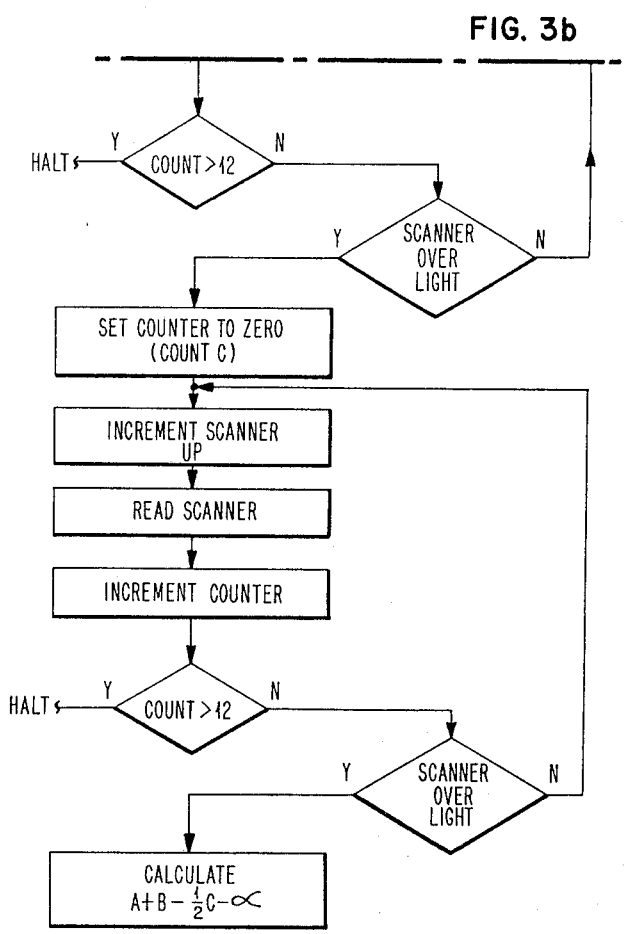

Reference to the flow diagram of FIG. 3 shows that the automatic operation is halted if Count A becomes greater than 48, if Count B becomes greater than 12, or if Count C becomes greater than 12. Such increments indicate total distances so much greater than the dimensions involved that the system is established as not operating for the purpose intended.

Reading Coded Page

Regardless of whether the compensating factor for error check just described is practiced, the alignment mark 5, printed as part of the printing of bar code 3, functions as a basic element in reading of bar code 3. FIG. 1 illustrates a typical page carrying printing of several lines of the bar code 3, with an alignment mark 5 at the top.

For reading, the operator manually steps the platen 22, by use of a platen forward key or control 56 and a platen reverse key or control 58, to bring the carrier 33 above the mark 5. Any vertical displacement of optical scanner 32 less than 192 increments is satisfactory, but, as will be described in connection with the flow diagram of FIG. 4, the system is designed to recognize a longer displacement as an error condition. The dotted cross 60 in FIG. 1 indicates a point properly and sufficiently above mark 5.

The operator then manually operates the read bar code key 54. Further operation is automatic under control of alignment control 38. The first action is the centering of scanner 32 over mark 5. Control 38 directs movement of carrier drive 34 through carrier control 36 to a point spaced the predetermined amount from the left margin of paper 20 at which the nominal or approximate center of mark 5 will appear. This automatic sequence is shown as the first operation in the flow diagram in FIG. 4. (Alignment mark 5 is two inches wide, which is more than enough to provide for imprecision in the actual system. Typically, an alignment mark four times as wide as the 68.5 mil height would function adequately.)

After centering, the counter is set to zero, prior to the generation of Count A. Scanner 32 is moved effectively downward by platen drive 26 moving paper 20 on platen 22 forward under control of platen stepping control 28. Scanner 32 is read and the counter incremented until the scanner 32 senses the transition from light to dark. Count A is completed and stored in alignment control 38. The counter is reset to zero and a new count, Count B, is begun, also of increments of platen drive 26 as paper 20 is continued to be moved upward. At a certain point of scanner 32 being over white paper on the bottom side of mark 5, the optical system will recognize light. Count B is then completed and stored in alignment control 38.

As discussed more fully in the foregoing treatment of the printing of bar code, optical scanner 32 has an effective opening 30 mils high. Thus, the response to mark 5 may show the mark larger or smaller than it actually is, depending upon the sensitivity of the photoconductor involved. The center of mark 5 will be accurately indicated.

In the actual preferred implementation, for reasons not essentially related to this invention, the circuits responding to scanner 32 are not highly reliable at the initial transition from white to dark. For that reason, a third count, Count C, is made. The counter is reset to zero and paper 20 is moved downward by increments through platen drive 26. The increments step the counter to accumulate Count C.

At a certain location of scanner 32 over white paper on the top side of mark 5, the optical system will recognize light. Count C is then completed and stored in alignment control 38. One half of Count C is the calculated. Carrier 33 is moved that value plus 16 increments of platen drive 26 and reading of bar code is begun.

The value 16 is that of the pre-established displacement between the center of the alignment mark 5 and the first line of bar code 3. The factor ½ Count C locates the center of mark 5. In a generalized formula, the factor 16 is replaced by the number of increments which the center of bar code is spaced vertically from the center of the alignment mark on the paper to be read.

Figure 4A:
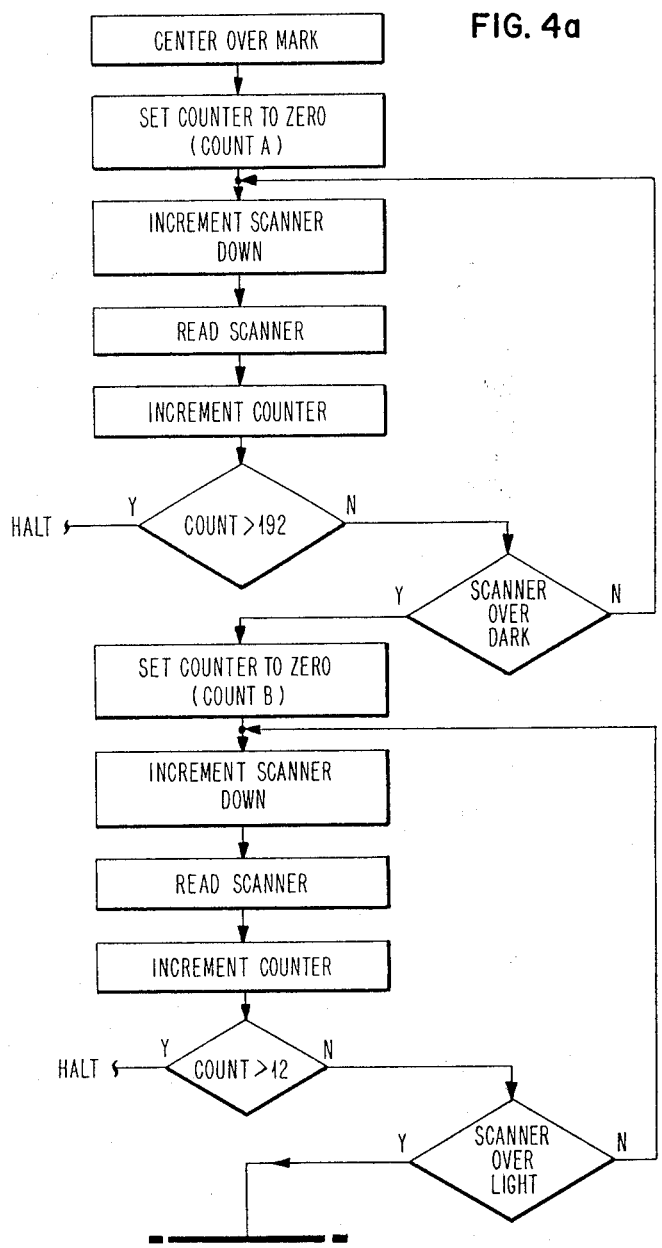
FIG. 4a and FIG. 4b are a flow diagram of the reading sequence employing the alignment mark.
Figure 4B:
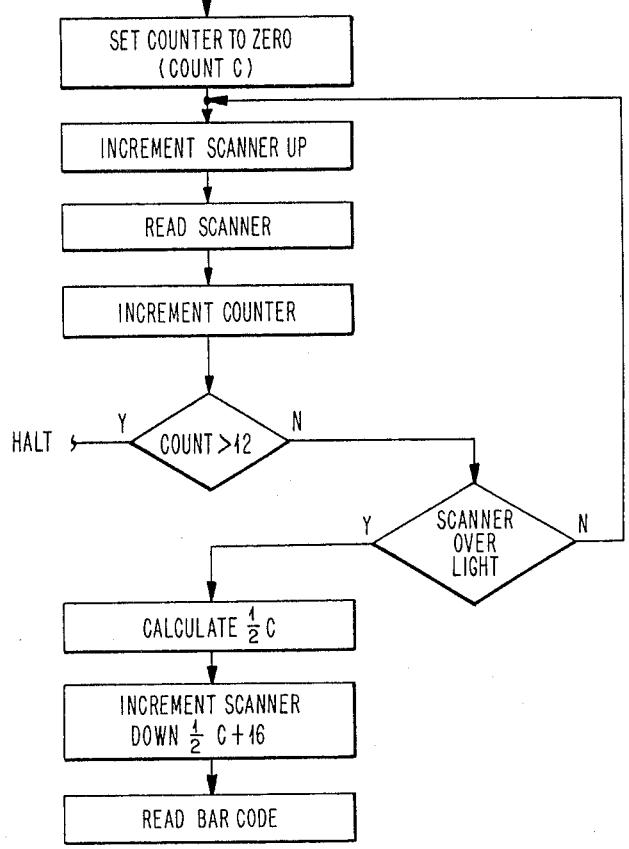

Reference to the flow diagram of FIG. 4 shows that the automatic operation is halted if Count A becomes greater than 192, if Count B becomes greater than 12, or if Count C becomes greater than 12. Such increments indicate total distances so much greater than the dimension which should exist that the system is halted as not properly.

What is claimed is:

1. The method of recording information using a printer capable of printing both bar code information having separated bars and a closed alignment symbol extending in length at least the width of several of said bars comprising the steps of printing said closed symbol with said printer, spacing said printer relative to said closed symbol printed, and printing bar code information with said printer wherein the improvement comprises scanning for the closed symbol printed after it is printed with a scanner which is mounted for movement with the printer to determine the location of an edge of said symbol, then determining a correction factor defining the difference between the location of printing by said printer and the location of scanning by said scanner, then printing bar code information with said printer, then positioning the scanner generally near the center of said printed bar code by use of said correction factor and reading said bar code with said scanner.

2. The method as in claim 1 in which said bars are no higher than a first height and said closed symbol is a rectangle of height of the order of magnitude of said first height and of width substantially greater than said height.

3. The method as in claim 2 in which said scanning of the closed symbol includes a first measurement of distance from a known starting position to a point when said scanner signals a transition between said closed symbol and background.

4. The method as in claim 3 in which said correction factor is computed by taking a difference of movement of the starting point perpendicular to the long dimension of said symbol to the distance to the center of said symbol as at least partially located by said transition.

5. The method as in claim 4 in which said scanning also includes a measurement of the distance between transition from said closed symbol to background on the side of said symbol opposite the side from which the initial transition is observed and said two transition are used to find the center of said symbol.

6. The method as in claim 2 in which said bars are of generally equal height, said width of said rectangle is at least four times said height, and the width of said code is positioned in parallel with the width of said closed symbol.

7. The method as in claim 3 in which said bar are of generally equal height, said width of said rectangle is at least four times said height, and the width of said code is positioned in parallel with the width of said closed symbol.

8. The method as in claim 4 in which said bars are of generally equal height, said width of said rectangle is at least four times said height, and the width of said code is positioned in parallel with the width of said closed symbol.

9. The method as in claim 5 in which said bars are of generally equal height, said width of said rectangle is at least four times said height, and the width of said code is positioned in parallel with the width of said closed symbol.

10. The printer system to record bar code information in a line with a closed alignment mark in a parallel line, with the printer being relatively moveable along said line, and being relatively moveable perpendicular to said line by increments of predefined length, with means to cause said printer to print said alignment mark and said bar code, and having a scanner mounted for movement with said printer for reading said bar code and observing transitions from light to dark in said alignment mark, wherein the improvement comprises means to move said scanner a known number of said increments and over said alignment mark after said printer prints said alignment mark, means to move said scanner toward said mark by said increments while counting said increments until said scanner signals a transition between said mark and background, and means to position said scanner during subsequent reading of code printed by said printer to a position toward the center of said code an amount defined by the difference between the said known number of increments and the center of said symbol as at least partially located by said transition.

11. The printer system as in claim 10 also comprising means to scan perpendicular to said mark after said transition between said mark and background and to count said increments of movement to the next transition between said mark and background, and means employing one half of the count to said next transition as defining the center of said symbol.

* * * * *